(12) United States Patent
Takahashi

(10) Patent No.: US 12,509,085 B2
(45) Date of Patent: Dec. 30, 2025

(54) LANE CHANGE SUPPORT DEVICE

(71) Applicant: TOYOTA JIDOSHA KABUSHIKI KAISHA, Toyota (JP)

(72) Inventor: Kentaro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 18/782,453

(22) Filed: Jul. 24, 2024

(65) Prior Publication Data
US 2024/0409096 A1  Dec. 12, 2024

Related U.S. Application Data

(63) Continuation of application No. 17/835,528, filed on Jun. 8, 2022, now Pat. No. 12,077,159.

(51) Int. Cl.
*B60W 40/09* (2012.01)
*B60W 30/18* (2012.01)
(Continued)

(52) U.S. Cl.
CPC ...... *B60W 30/18163* (2013.01); *B60W 40/04* (2013.01); *B60W 40/09* (2013.01);
(Continued)

(58) Field of Classification Search
CPC .......... B60W 30/18163; B60W 40/04; B60W 40/09; B60W 50/0098; B60W 2050/0083; B60W 2540/223; B60W 2556/10; B60W 2420/403; B60W 2420/408; B60W 10/18; B60W 10/20; B60W 40/08; B60W 2520/10; B60W 2520/14; B60W 2540/10;
(Continued)

(56) References Cited

U.S. PATENT DOCUMENTS 9,643,650 B2 * 5/2017 Sim .................... B60K 31/0008
10,676,093 B2 * 6/2020 Nishiguchi .......... B60W 10/06
(Continued)

FOREIGN PATENT DOCUMENTS

| JP | 2017-102519 A | 6/2017 |
| JP | 2018-103769 A | 7/2018 |
| JP | 2020-166391 A | 10/2020 |

OTHER PUBLICATIONS

U.S. Appl. No. 17/835,528, filed Jun. 8, 2022, Kentaro Takahashi.

*Primary Examiner* — Richard M Camby
(74) *Attorney, Agent, or Firm* — Dinsmore & Shohl LLP

(57) ABSTRACT

A lane change support device includes a control unit configured to execute lane change control for enabling a vehicle to automatically change lanes from a lane in which the vehicle is traveling to an adjacent lane. The control unit counts a holding time for which an operation part that is operated to a predetermined operation position to start the lane change control is continuously held at the operation position, starts the lane change control when the counted holding time reaches a predetermined threshold time, and calculates a proficiency level of a driver of the vehicle for an operation of the lane change support device during execution of the lane change control and sets the threshold time to be used for a successive lane change control based on the proficiency level.

12 Claims, 6 Drawing Sheets

(51) Int. Cl.
  *B60W 40/04* (2006.01)
  *B60W 50/00* (2006.01)
  *B62D 15/02* (2006.01)

(52) U.S. Cl.
  CPC ..... *B60W 50/0098* (2013.01); *B62D 15/0255* (2013.01); *B60W 2050/0083* (2013.01); *B60W 2540/223* (2020.02); *B60W 2556/10* (2020.02)

(58) Field of Classification Search
  CPC ......... B60W 2540/12; B60W 2540/18; B60W 2540/20; B60W 2556/50; B62D 15/0255; B60Q 1/346; B60Q 1/40
  See application file for complete search history.

(56) References Cited

U.S. PATENT DOCUMENTS

| | | | |
|---|---|---|---|
| 11,938,940 B2 * | 3/2024 | Aso | B60W 30/18163 |
| 2016/0288707 A1 * | 10/2016 | Matsumura | B60W 30/0956 |
| 2017/0088175 A1 * | 3/2017 | Okuda | B62D 15/025 |
| 2018/0037216 A1 * | 2/2018 | Otake | B60W 30/18109 |
| 2018/0037260 A1 * | 2/2018 | Otake | G05D 1/0055 |
| 2018/0178715 A1 | 6/2018 | Fujii | |
| 2018/0345964 A1 | 12/2018 | Fujii | |
| 2018/0345978 A1 * | 12/2018 | Fujii | B62D 15/0255 |
| 2018/0354517 A1 | 12/2018 | Banno et al. | |
| 2022/0036122 A1 | 2/2022 | Hige | |
| 2023/0028132 A1 | 1/2023 | Takahashi | |

* cited by examiner

LANE CHANGE SUPPORT DEVICE

CROSS-REFERENCE TO RELATED APPLICATION

This application is a Continuation application of U.S. application Ser. No. 17/835,528, filed on Jun. 8, 2022, which claims priority to Japanese Patent Application No. 2021-115657 filed on Jul. 13, 2021, incorporated herein by reference in its entirety.

BACKGROUND

1. Technical Field

The present disclosure relates to a lane change support device that enables a subject vehicle to automatically change lanes from a traveling lane to an adjacent lane.

2. Description of Related Art

Japanese Unexamined Patent Application Publication No. 2018-103769 (JP 2018-103769 A) discloses a lane change support device that enables a subject vehicle to automatically change lanes from a traveling lane to an adjacent lane. The lane change support device detects an operation of an operating lever by a driver and counts a holding time for which the operating lever is continuously held at a predetermined operation position. When the counted holding time reaches a predetermined threshold time, the lane change support device starts lane change control.

SUMMARY

In the lane change support device, if the threshold time used to determine the start of control is set to be long, there may be a difference between a time at which the driver intends to start the lane change and a time at which the lane change control is actually started. In addition, depending on a situation, the lane change may not be executed because a positional relationship between the subject vehicle and a nearby vehicle changes before the lane change control is started. As a result, the usability of the device may be impaired or the driver may be inconvenienced.

On the other hand, if the threshold time is set to be short, even when the driver's intention to use the device is not clear, or even when the driver neglects to check a surrounding situation, the device may start operating, which may affect safety.

The present disclosure provides a lane change support device capable of optimizing a start time of lane change control by appropriately setting a threshold time to be used for determining the start of control.

A lane change support device according to an aspect of the present includes a control unit configured to execute lane change control for disclosure enabling a vehicle to automatically change a lane from a lane in which the vehicle is traveling to an adjacent lane. The control unit is configured to count a holding time for which an operation part that is operated to an operation position to start the lane change control is continuously held at the operation position, start the lane change control when the counted holding time reaches a predetermined threshold time, and calculate a proficiency level of a driver of the vehicle for an operation of the lane change support device during execution of the lane change control and set the threshold time to be used for a successive lane change control based on the proficiency level.

With the above configuration, the control unit calculates the driver's proficiency level during the execution of the lane change control, and appropriately updates the threshold time used for the successive lane change control according to the calculated proficiency level. As a result, the lane change control can be executed safely and efficiently, and the usability of the lane change support device can be improved.

In the aspect, the control unit may compare a previous proficiency level calculated during previous execution of the lane change control with a current proficiency level calculated during current execution of the lane change control, shorten the threshold time to be used for a successive lane change control when the current proficiency level is higher than the previous proficiency level, and extend the threshold time to be used for the successive lane change control when the current proficiency level is lower than the previous proficiency level.

With the above configuration, the threshold time can be appropriately extended or shortened depending on the driver's proficiency level, and the lane change control that is driver friendly can be realized.

In the aspect, the proficiency level may be calculated based on an evaluation result obtained from a driving situation of the driver during the execution of the lane change control and an evaluation result obtained from an end state of the lane change control. In this case, the driving situation of the driver may include a state of a steering holding of the driver and a situation of a nearby vehicle.

With the above configuration, the proficiency level is calculated based on the driving situation of the driver during the execution of the lane change control, for example, the state of the steering holding (whether the driver holds the steering wheel) and the situation of the nearby vehicle (whether the driver tries to execute the LCA control while checking the situation of the nearby vehicle). Therefore, it is possible to calculate an appropriate proficiency level that reflects the driver's behavior during the execution of the lane change control. Further, the proficiency level is calculated based on the end state (normal end or abnormal end) of the lane change control. Therefore, it is possible to calculate an appropriate proficiency level that reflects the driver's perception of the safety of the lane change control.

In the aspect, the proficiency level may be calculated based on an evaluation score for the proficiency level obtained from the state of the steering holding of the driver, an evaluation score for the proficiency level obtained from the situation of the nearby vehicle, and an evaluation score for the proficiency level obtained from the end state of the lane change control.

With the above configuration, since the proficiency level is quantified based on the evaluation score, the proficiency level can be calculated quantitatively. Therefore, the proficiency level can be calculated objectively, and thus have a versatility.

In the above explanation, in order to help the understanding of the disclosure, the reference numerals and letters used in the embodiment are added in parentheses to the constituent elements of the disclosure corresponding to the embodiment. However, each constituent element of the disclosure is not limited to the embodiment defined by the reference numerals and letters.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
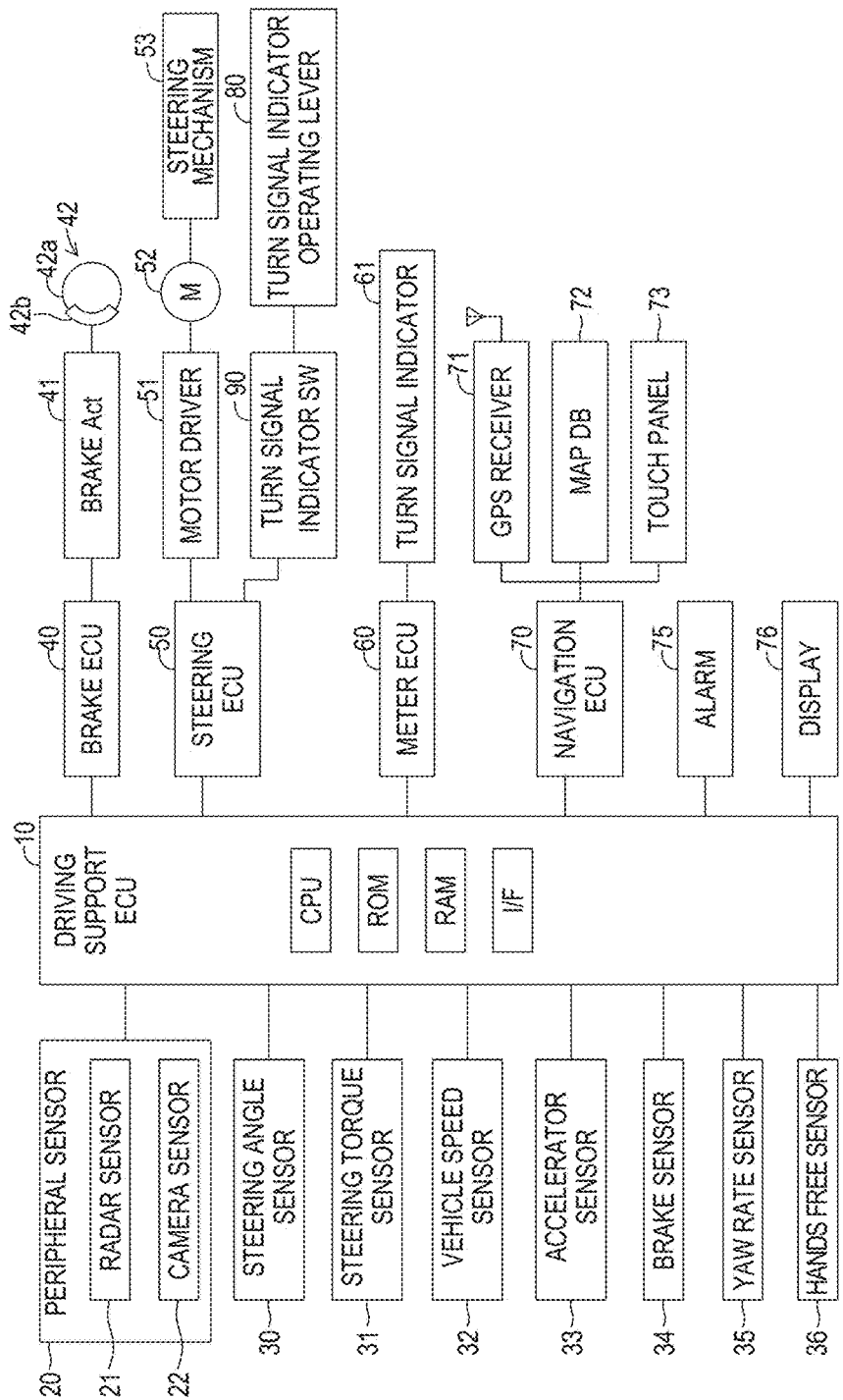
FIG. 1 is a schematic configuration diagram of a vehicle lane change support device according to a present embodiment.

Hereinafter, a lane change support device (hereinafter, also referred to as "the present implementation device") according to a present embodiment will be described with reference to the drawings. The same parts are designated by the same reference numerals and letters, and their names and functions are also the same. Therefore, detailed description of them will not be repeated.

Configuration

As illustrated in FIG. 1, the present implementation device includes a driving support ECU 10 (control unit), a brake ECU 40, a steering ECU 50, a meter ECU 60, and a navigation ECU 70. The ECUs 10, 40, 50, 60, 70 are respectively provided with microcomputers as main parts, and are connected to one another via a controller area network (CAN) (not illustrated) so as to be able to transmit and receive data. The ECU is an abbreviation for the electronic control unit. The microcomputer includes a CPU, a ROM, a RAM, an interface, and the like, and the CPU realizes various functions by executing instructions (programs, routines) stored in the ROM. Some or all of the ECUs 10, 40, 50, 60, 70 may be integrated into one ECU as a controller. Hereinafter, the vehicle equipped with the present implementation device will be referred to as "subject vehicle VS".

The driving support ECU 10 is a central control device which assists the driver with driving, and in the present embodiment, the driving support ECU 10 executes lane change control. The driving support ECU 10 is connected to various sensors and switches such as a peripheral sensor 20, a steering angle sensor 30, a steering torque sensor 31, a vehicle speed sensor 32, an accelerator sensor 33, a brake sensor 34, a yaw rate sensor 35, and a hands free sensor 36. The driving support ECU 10 is adapted to acquire signals from the sensors and switches every time a predetermined cycle elapses.

The steering angle sensor 30 detects the steering angle θ of a steering wheel (or steering shaft) (not illustrated). The steering torque sensor 31 detects the steering torque acting on the steering shaft (not illustrated) of the subject vehicle VS by operating the steering wheel. The vehicle speed sensor 32 detects the traveling speed (vehicle speed) of the subject vehicle VS. The accelerator sensor 33 detects the operation amount of an accelerator pedal (not illustrated). The brake sensor 34 detects the operation amount of a brake pedal (not illustrated). The yaw rate sensor 35 detects the yaw rate of the subject vehicle VS.

Figure 2:
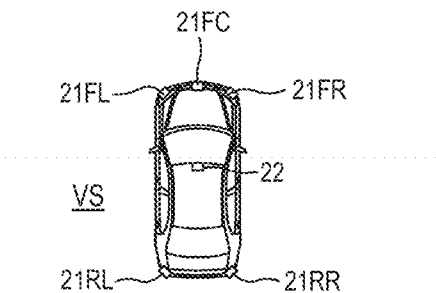
FIG. 2 is a plan view illustrating mounting positions of a radar sensor and a camera sensor.

The peripheral sensor 20 includes a radar sensor 21 and a camera sensor 22. Specifically, as illustrated in FIG. 2, the radar sensor 21 includes a center front radar sensor 21FC, a right front radar sensor 21FR, a left front radar sensor 21FL, a right rear radar sensor 21RR, and a left rear radar sensor 21RL. Each of the sensors 21FC, 21FR, 21FL, 21RR, 21RL is a radar sensor in the present embodiment, but other sensors such as a clearance sonar can be adopted instead.

The center front radar sensor 21FC is provided in the center of the front of a vehicle body and detects a three-dimensional object existing in the front region of the subject vehicle VS. The right front radar sensor 21FR is provided at the right front corner of the vehicle body, and mainly detects a three-dimensional object existing in the right front region of the subject vehicle VS. The left front radar sensor 21FL is provided at the left front corner of the vehicle body, and mainly detects a three-dimensional object existing in the left front region of the subject vehicle VS. The right rear radar sensor 21RR is provided at the right rear corner of the vehicle body, and mainly detects a three-dimensional object existing in the right rear region of the subject vehicle VS. The left rear radar sensor 21RL is provided at the left rear corner of the vehicle body, and mainly detects a three-dimensional object existing in the left rear region of the subject vehicle VS.

The radar sensors 21FC, 21FR, 21FL, 21RR, 21RL differ only in their detection regions, and basically have the same configuration. The present disclosure does not exclude that each of the radar sensors 21FC, 21FR, 21FL, 21RR, 21RL has a different configuration from the other radar sensors. Further, hereinafter, when it is not necessary to individually distinguish the radar sensors 21FC, 21FR, 21FL, 21RR, 21RL, they may be simply referred to as radar sensors 21.

The radar sensor 21 includes a radar transmission and reception unit and a signal processing unit (not illustrated), and the radar transmission and reception unit emits radio waves (hereinafter, referred to as "millimeter waves") in the millimeter wave band and receives millimeter waves (that is, reflected waves) reflected by a three-dimensional object (for example, other vehicles, pedestrians, bicycles, buildings, and the like) existing in the radiation range. The signal processing unit acquires, based on the phase difference between the transmitted millimeter wave and the received reflected wave, the attenuation level of the reflected wave, the time from the transmission of the millimeter wave to the reception of the reflected wave, and the like, information (hereafter, referred to as peripheral information) indicating a distance between the subject vehicle VS and the three-dimensional object, a relative speed of the subject vehicle VS relative to the three-dimensional object, a relative position (direction) of the three-dimensional object with respect to the subject vehicle VS, and the like every time a predetermined time elapses, and supplies the information to the driving support ECU 10. From this peripheral information, it is possible to detect the anteroposterior component and the lateral component in the distance between the subject vehicle VS and the three-dimensional object, and the anteroposterior component and the lateral component in the relative speed of the subject vehicle VS relative to the three-dimensional object.

The camera sensor 22 includes a camera unit and a lane recognition unit that analyzes image data obtained when the camera unit takes a picture and recognizes a white line on a road. The camera sensor 22 (camera unit) captures the scenery in front of the subject vehicle VS. The camera sensor 22 (lane recognition unit) supplies information on the recognized white line to the driving support ECU 10.

Figure 3:
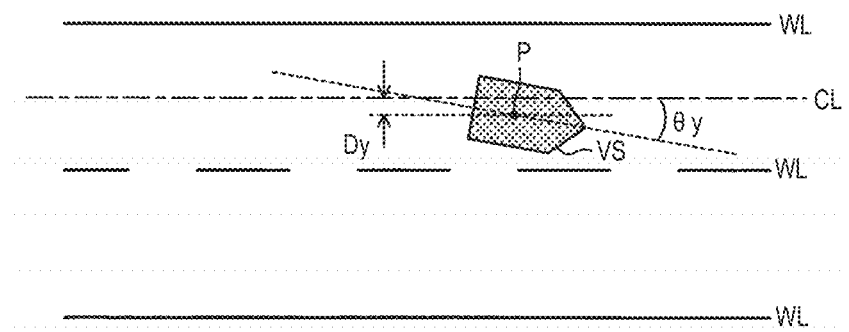
FIG. 3 is a diagram illustrating lane-related vehicle information.

Based on the information supplied from the camera sensor 22, the driving support ECU 10 sets a lane center line CL that is the center position in the width direction of the right and left white lines WL in the lane in which the subject vehicle VS is traveling, as illustrated in FIG. 3. Further, the driving support ECU 10 calculates a curvature Cu of the curve of the lane center line CL.

Further, the driving support ECU 10 calculates the position and orientation of the subject vehicle VS in the lane partitioned by the right and left white lines WL. For example, as illustrated in FIG. 3, the driving support ECU 10 calculates a distance Dy in the road width direction between a reference point P (for example, the position of the center of gravity) of the subject vehicle VS and the lane center line CL, that is, the distance (lateral deviation) Dy in which the subject vehicle VS deviates from the lane center line CL in the road width direction. Further, the driving support ECU 10 calculates an angle formed by the direction of the lane center line CL and the direction in which the subject vehicle VS is facing, that is, an angle (yaw angle) θy in which the direction in which the subject vehicle VS is facing is tilted horizontally with respect to the direction of the lane center line CL. Hereinafter, the information (Cu, Dy, θy) representing the curvature Cu, the lateral deviation Dy, and the yaw angle θy is referred to as lane-related vehicle information.

The camera sensor 22 supplies the driving support ECU 10 with information on the white line, such as the type of detected white line (solid line, broken line), the distance (lane width) between the adjacent right and left white lines, and the shape of the white line, including not only the lane of the subject vehicle VS but also the adjacent lane. When the white line is a solid line, vehicles are prohibited from changing lanes across the white line. On the other hand, when the white line is a broken line (white line formed intermittently at regular intervals), the vehicle is allowed to change a lane across the white line. Such lane-related vehicle information (Cu, Dy, θy) and information related to the white line are collectively referred to as lane information.

In the present embodiment, the driving support ECU 10 calculates the lane-related vehicle information (Cu, Dy, θy), but instead, the camera sensor 22 may be configured to calculate the lane-related vehicle information (Cu, Dy, y) and supply the calculation result to the driving support ECU 10.

Here, the camera sensor 22 can also detect a three-dimensional object existing in front of the subject vehicle VS based on the image data. Therefore, the camera sensor 22 may acquire the peripheral information in front of the vehicle in addition to the lane information by calculation. In this case, for example, a synthesis processing unit (not illustrated) which synthesizes the peripheral information acquired by the center front radar sensor 21FC, the right front radar sensor 21FR, and the left front radar sensor 21FL and the peripheral information acquired by the camera sensor 22 to generate the peripheral information in front of the vehicle with high detection accuracy may be provided, and the peripheral information generated by the synthesis processing unit may be supplied to the driving support ECU 10 as peripheral information on a situation in front of the subject vehicle VS.

Returning to FIG. 1, the brake ECU 40 is connected to a brake actuator 41. The brake actuator 41 is provided in a hydraulic circuit between a master cylinder (not illustrated) that pressurizes hydraulic oil by the pedaling force of a brake pedal and friction brake mechanisms 42 respectively provided on the right, left, front and rear wheels. The friction brake mechanism 42 includes a brake disc 42a fixed to the wheel and a brake caliper 42b fixed to the vehicle body. The brake actuator 41 adjusts the hydraulic pressure supplied to a wheel cylinder built in the brake caliper 42b in response to an instruction from the brake ECU 40, and then the brake actuator 41 presses a brake pad against the brake disc 42a by operating the wheel cylinder by the hydraulic pressure to generate a friction braking force. The brake system is not limited to the disc type brake shown in the illustrated example, and may be a drum type brake or the like.

The steering ECU 50 is a control device for the electric power steering device, and is connected to a motor driver 51 and a turn signal indicator switch (turn signal indicator SW) 90. The motor driver 51 is connected to a steering motor 52. The steering motor 52 is incorporated in a steering mechanism 53 (for example, a rack and pinion mechanism). The steering ECU 50 detects the steering torque input by the driver to the steering wheel (not illustrated) by the steering torque sensor 31, and controls the energization of the motor driver 51 based on the steering torque to drive the steering motor 52. By driving the steering motor 52, a steering torque is applied to the steering mechanism 53, such that a steering assist torque can be generated.

The driving support ECU 10 is configured to be able to transmit a steering command to the steering ECU 50. Upon receiving the steering command, the steering ECU 50 drives (controls) the steering motor 52 in response to the command. As a result, the driving support ECU 10 can automatically change the steering angle of the steering wheel via the steering ECU 50.

The meter ECU 60 is connected to right and left turn signal indicators 61. The meter ECU 60 causes the right or left turn signal indicator 61 to brink in response to a signal from the turn signal indicator SW 90 via a drive circuit (not illustrated). For example, the meter ECU 60 blinks the left turn signal indicator 61 when the turn signal indicator SW 90 outputs a signal indicating that a turn signal indicator operating lever 80 is operated counterclockwise. Further, the meter ECU 60 blinks the right turn signal indicator 61 when the turn signal indicator SW 90 outputs a signal indicating that the turn signal indicator operating lever 80 is operated clockwise.

The navigation ECU 70 is connected to a GPS receiver 71 that receives a GPS signal to detect the current position of the subject vehicle VS, a map database 72 that stores map information and the like, and a touch panel (touch panel display) 73. The navigation ECU 70 identifies the current position of the subject vehicle VS based on the GPS signal and performs various arithmetic processes based on the position of the subject vehicle VS and the map information and the like stored in the map database 72 to provide route guidance using the touch panel 73.

The map information stored in the map database 72 includes road information. The road information includes parameters (for example, the radius of curvature or curvature of the road indicating the degree of bending of the road, the lane width of the road, and the like) indicating the shape of the road for each section of the road. In addition, the road information also includes road type information that can distinguish whether the road is an expressway, lane number information, and median strip information that can distinguish whether a median strip is provided.

An alarm 75 and a display 76 are connected to the driving support ECU 10.

The alarm 75 sounds by receiving a ringing signal from the driving support ECU 10. The driving support ECU 10 sounds the alarm 75, for example, when notifying the driver of the driving support status or when calling attention to the driver.

The display 76 is, for example, a multi-information display provided in front of the driver's seat, and displays various information in addition to displaying measured values of meters such as a vehicle speed. When the display 76 receives, for example, a display command based on the driving support state from the driving support ECU 10, the display 76 displays the screen specified by the display command thereon. As the display 76, a head-up display (not illustrated) can be used in place of or in addition to the multi-information display. In some embodiments, when a head-up display is adopted, a dedicated ECU may be provided to control the display of the head-up display.

The hands free sensor 36 is a sensor that detects that the driver is not holding the steering wheel. The hands free sensor 36 transmits a release detection signal indicating whether the driver is holding the steering wheel to the driving support ECU 10. The driving support ECU 10 determines that the driver is in the "released state" when the steering wheel is not held by the driver for more than a preset release determination time while the lane change control described below is being executed. When the driving support ECU 10 determines that the driver is in the released state, the driving support ECU 10 sounds the alarm 75 to alert the driver. This alert is called a "steering holding request". In addition, the "steering holding request" may be displayed by the display 76.

The turn signal indicator operating lever 80 (hereinafter, abbreviated as the operating lever 80) is an operating device used for operating (blinking) the turn signal indicator 61, and is provided on, for example, a steering column or the like. Further, the operating lever 80 is provided with the turn signal indicator SW 90. The operating lever 80 is provided so as to pivot around the support shaft with two-stage operation strokes in each of the clockwise operation direction and the counterclockwise operation direction.

Figure 4:
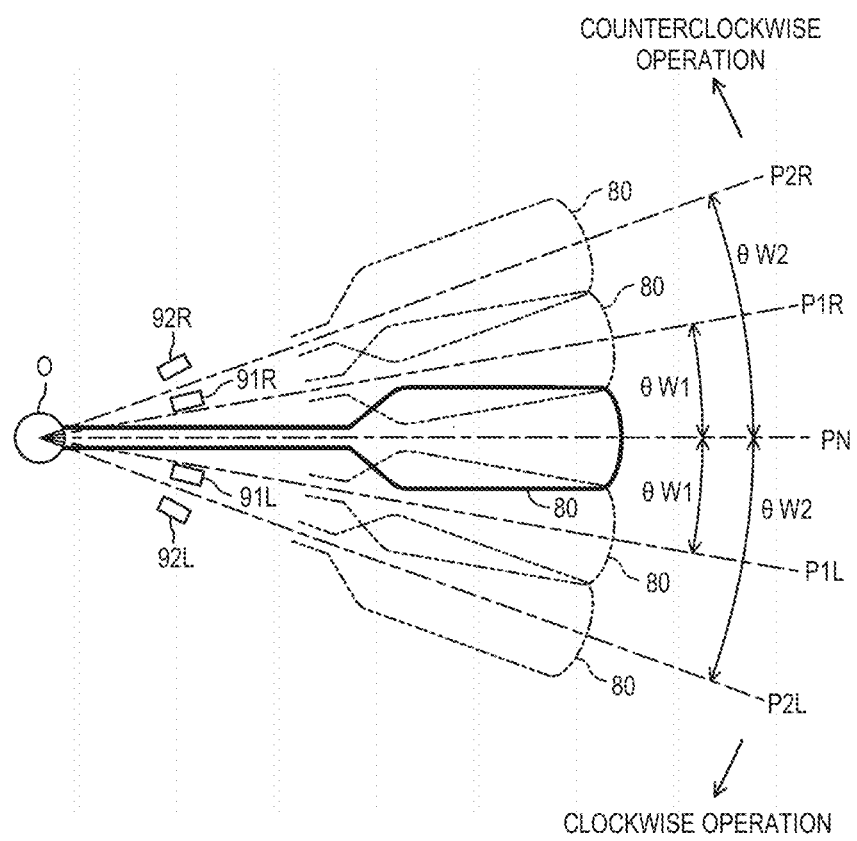
FIG. 4 is a diagram illustrating an operation of a turn signal indicator operating lever.

Specifically, as illustrated in FIG. 4, the operating lever 80 is configured to be selectively operable at a first operation position PIL (PIR), which is the position pivoted (pivoted by a first angle θW1 around a support shaft O) by a first stroke from a neutral position PN, and a second operation position P2L (P2R), which is the position where the operating lever 80 is pivoted (pivoted by a second angle θW2 (>θW1) around the support shaft O) by a second stroke deeper than that of the first operation position PIL (PIR) from the neutral position PN, in each of the clockwise operation direction and the counterclockwise operation direction. While the operating lever 80 is being operated to the first operation position PIL (PIR) or the second operation position P2L (P2R), the turn signal indicator 61 in the direction in which the operating lever 80 is operated blinks, and while the operating lever 80 is in the neutral position PN, the turn signal indicator 61 turns off.

When the operating lever 80 is tilted to the first operation position PIL (P1R) by the driver, the driver feels a click, and then when the operating force on the operating lever 80 is released from that state, the operating lever 80 is mechanically returned to the neutral position PN by a return mechanism (not illustrated) such as a spring. In addition, when the operating lever 80 is tilted to the second operating position P2L (P2R) by the driver, the operating lever 80 is held at the second operation position P2L (P2R) by a mechanical locking mechanism (not illustrated) even when the operating force is released.

When the operating lever 80 is held in the second operation position P2L (P2R) and the steering wheel rotates in the reverse direction and is returned to the neutral position, or when the driver returns the operating lever 80 to the neutral position PN side, the lock is released by the lock mechanism and the operating lever 80 is returned to the neutral position PN. That is, when the operating lever 80 is operated to the second operation position P2L (P2R), the operating lever 80 operates in the same manner as the turn signal indicator blinking device as generally performed in the related art. Hereinafter, the operation in which the operating lever 80 is pressed up or down to the first operation position PIL (PIR) is called a "light press operation", and the operation in which the operating lever 80 is pressed up or down to the second operation position P2L (P2R) is called a "forceful press operation".

The turn signal indicator SW 90 includes a first switch 91L (91R), which turns on only when the operating lever 80 is pressed lightly to the first operation position PIL (PIR), and a second switch 92L (92R), which turns on only when the operating lever 80 is pressed forcefully to the second operation position P2L (P2R).

The first switch 91L (91R) transmits an on signal to the driving support ECU 10 while the operating lever 80 is located at the first operation position PIL (PIR). The second switch 92L (92R) transmits an on signal to the driving support ECU 10 while the operating lever 80 is located at the second operation position P2L (P2R). In the above description, the operation position and the switch indicated by the reference numerals and letters in parentheses are the operation position and the switch with respect to the clockwise operation direction.

The driving support ECU 10 receives a monitor signal indicating whether the operating lever 80 is pressed lightly, that is, the ON/OFF state of the first switch 91L (91R), and a monitor signal indicating whether the operating lever 80 is pressed forcefully, that is, the ON/OFF state of the second switch 92L (92R). Hereinafter, the monitor signal indicating the ON/OFF state of the first switch 91L (91R) is referred to as a "light press operation monitor signal", and the monitor signal indicating the ON/OFF state of the second switch 92L (92R) is referred to as a "deep press operation monitor signal". The light press operation monitor signal and the deep press operation monitor signal also include signals used for specifying the operation direction (clockwise-counterclockwise direction) of the operating lever 80.

The driving support ECU 10 counts an ON continuation time of the light press operation monitor signal, in other words, the time (hereinafter, referred to as holding time Th) during which the operating lever 80 is continuously held by the driver at the first operation position PIL (PIR). Further, the driving support ECU 10 determines whether the counted holding time Th has reached a predetermined threshold time Tv set in advance. When the holding time Th reaches the threshold time Tv, the driving support ECU 10 confirms the driver's lane change request and starts the lane change control. Hereinafter, the lane change control is referred to as lane change assist control (LCA control).

LCA Control

The LCA control is a control that changes the steering angle of the subject vehicle VS by operating the steering motor 52 and applying the steering torque to the steering mechanism 53 such that the subject vehicle VS moves from a currently driving lane (hereinafter, an original lane) to a driver's desired lane (hereinafter, a target lane) adjacent to the own lane, thereby supporting the steering operation (steering wheel operation) by the driver. Therefore, according to the LCA control, the subject vehicle VS can be automatically changed from the original lane to the target lane without requiring the steering operation by the driver.

The LCA control is a control in which, for example, based on the operation of the operating lever 80 by the driver, a "target lateral position of the subject vehicle VS" based on the lane center line of the original lane is set as a function of time t from the start of LCA control so as to move the subject vehicle VS from the original lane to the target lane in the width direction of the road at a predetermined time, and then the steering angle of the subject vehicle VS is changed such that the lateral position of the subject vehicle VS matches the target lateral position.

Figure 5:
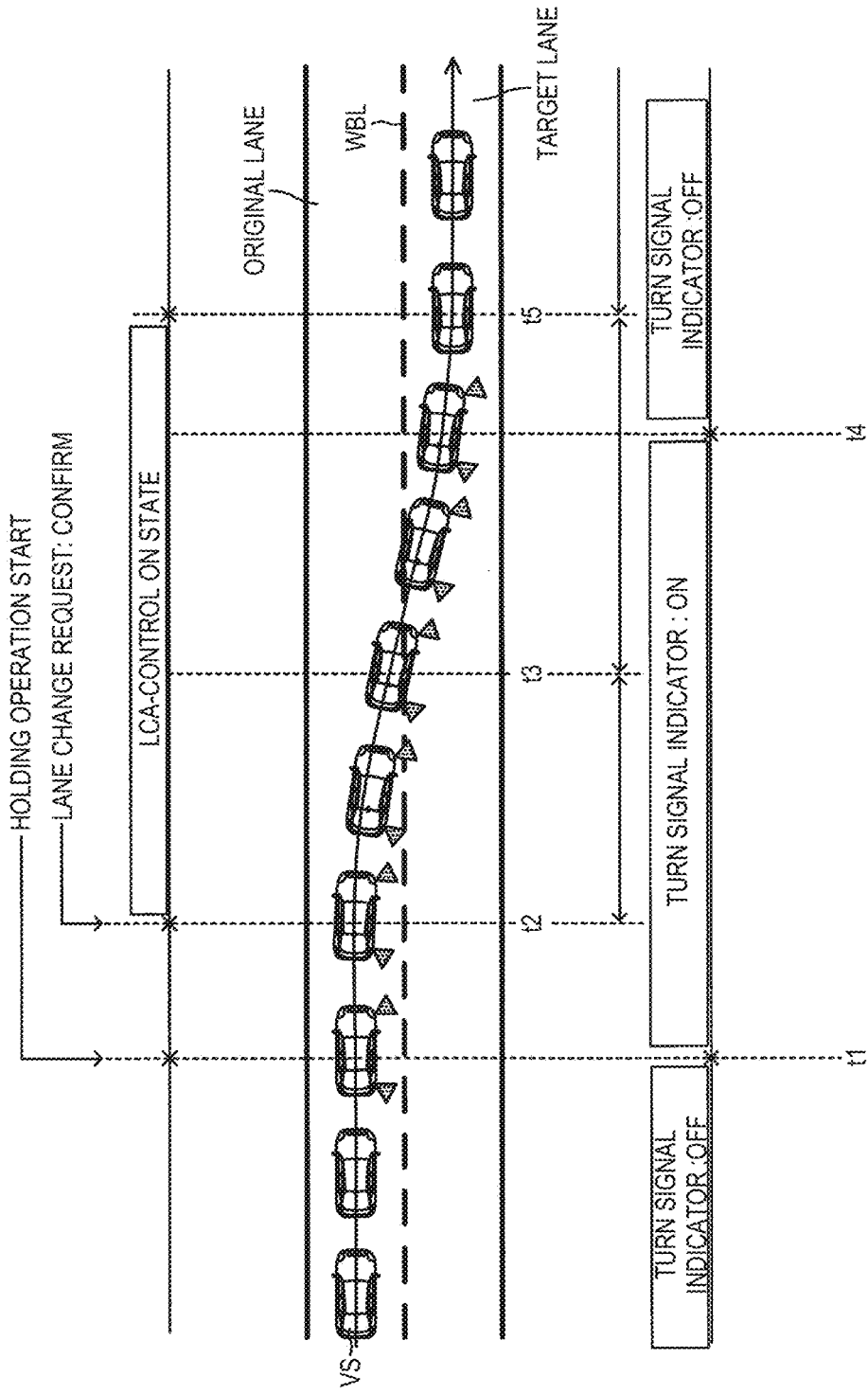
FIG. 5 is a time chart illustrating an example of a time of an operation of the turn signal indicator operating lever by a driver when lane change control is executed.

FIG. 5 is a time chart illustrating an example of a time of an operation of the operating lever 80 by the driver when the subject vehicle VS executes the LCA control used for changing the lane to the target lane on the right side. An example of the time of the operation of the operating lever 80 when the subject vehicle VS changes the lane to the target lane on the left side is the same as the example of FIG. 5 except that the direction of the operation of the operating lever 80 and the direction of the lane change are different.

The right turn signal indicator 61 blinks when the holding operation of holding the operating lever 80 is at the first operation position PIR at time t1. Then, at time t2, when the holding time Th in which the operating lever 80 is continuously held in the first operation position PIR reaches the threshold time Tv, the driving support ECU 10 determines that the driver's lane change request to the right lane has been confirmed. When the lane change request is confirmed, the driving support ECU 10 starts the LCA control and determines whether a predetermined execution permission condition is satisfied.

Here, as the execution permission condition of the LCA control, for example, the following (1) to (4) can be mentioned.

(1) There are no other vehicles in the target lane to which the lane of the subject vehicle VS is changed.
(2) There are no other vehicles approaching the subject vehicle VS from behind within a predetermined time in the target lane to which the lane of the subject vehicle VS is changed.
(3) The camera sensor 22 recognizes the relative position of the subject vehicle VS in the lane width direction with respect to the original lane, and the white line (the white line that is the boundary between the original lane and the target lane) in the operating direction of the operating lever 80 is a broken line.
(4) The road is an expressway (operation target road) on which the LCA control can be executed.

The condition (1) is satisfied when it is estimated that an inter-vehicle distance between the two vehicles is appropriately secured after the lane change based on the relative speed of the subject vehicle VS relative to another vehicle traveling in the target lane. The condition (2) is satisfied when there is no other vehicle predicted to enter a blind spot area of the subject vehicle VS in the target lane within a predetermined time. The relative speed in relation to another vehicle may be acquired by, for example, the peripheral sensor 20.

Regarding the condition (4), for example, it may be determined whether the road on which the subject vehicle VS is traveling is the operation target road based on the current position of the subject vehicle VS received by the GPS receiver 71 and from the map information (road information) stored in the map database 72. The execution permission conditions for the LCA control are not limited to these conditions (1) to (4), and can be set arbitrarily. For example, in addition to the conditions (1) to (4), a condition that adaptive cruise control (ACC) control is being executed and a condition that lane tracing assist (LTA) control is being executed may be added.

When all of the execution permission conditions (1) to (4) are satisfied, the driving support ECU 10 starts the operation of the steering motor 52 under the LCA control. On the other hand, when all of the execution permission conditions (1) to (4) are not satisfied after the lane change request is confirmed and before a predetermined acceptance refusal time Tc elapses, the driving support ECU 10 prohibits (cancels) the operation of the steering motor 52 under the LCA control.

When the operation of the steering motor 52 under the LCA control is started at time t2, the subject vehicle VS moves toward the target lane on the right side located in the operating direction of the operating lever 80, and enters the target lane across a white line WBL (broken line) that is the boundary between the original lane and the target lane.

At time t3, when the subject vehicle VS crosses the white line WBL (broken line) and enters the target lane, the driving support ECU 10 determines whether there is another vehicle (hereinafter, referred to as "rear approaching vehicle") approaching the subject vehicle VS within a predetermined time from the rear based on the detection result of the peripheral sensor 20. When there is a "rear approaching vehicle" in the target lane, the driving support ECU 10 issues a "vehicle approach warning" to the driver, stops the LCA control, and causes the subject vehicle VS to moves (returns) the original lane. The "vehicle approach warning" may be performed by either one or both of the alarm 75 and the display 76. When there is no rear approaching vehicle, the driving support ECU 10 continues the LCA control.

At time t4, when a predetermined turn-off condition of a turn signal indicator is satisfied, the driving support ECU 10 turns off the right turn signal indicator 61. The predetermined turn-off condition of the turn signal indicator may be satisfied, for example, when both the condition that the subject vehicle VS has crossed the white line (broken line) WBL and the condition that the lateral distance between the current position of the subject vehicle VS and a final target lateral position is equal to or less than a turn-off permission distance are satisfied.

When a predetermined LCA completion condition is satisfied at time t5, the driving support ECU 10 completes (ends) the LCA control. The predetermined LCA completion condition may be satisfied, for example, when the turn-off condition of the turn signal indicator is satisfied and the elapsed time from the start of the LCA control reaches a target lane change time.

Specific Operation

Next, the specific operation of the driving support ECU 10 will be described. The driving support ECU 10 executes a "LCA control routine" represented by a flowchart of FIG. 6. Further, the driving support ECU 10 of the present implementation device has a proficiency level evaluation function used for calculating a proficiency level of the driver and a function used for extending or shortening a threshold time $Tv_n$ depending on the calculated proficiency level. The driving support ECU 10 executes the calculation of the proficiency level of the driver together with the LCA control routine illustrated in FIG. 6.

LCA Control Routine

First, the LCA control routine illustrated in FIG. 6 will be described. The driving support ECU 10 acquires whether the driver has operated the operating lever 80 to the first operation position PIL (PIR) in step S100. When the operating lever 80 is not operated to the first operation position PIL (PIR) (No), the driving support ECU 10 temporarily ends the LCA control routine. On the other hand, when the operating lever 80 is operated to the first operation position PIL (PIR) (Yes), the driving support ECU 10 advances the process to step S110 and starts the counting (timekeeping) of the holding time Th.

In step S120, the driving support ECU 10 determines whether the holding time Th has reached the predetermined threshold time $Tv_n$. When the holding time Th has not reached the threshold time $Tv_n$ (No), the driving support ECU 10 returns the process to step S100, and determines whether the operating lever 80 is operated to the first operation position PIL (PIR). When the determination here is negative (No), that is, when the operating lever 80 is operated to the first operation position PIL (PIR) only for a short time, the LCA control routine is temporarily ended. On the other hand, when the holding time Th reaches the threshold time $Tv_n$ in the determination of step S120 (Yes), the driving support ECU 10 advances the process to step S130.

In step S130, the driving support ECU 10 determines whether the execution permission condition for the LCA control is satisfied. An example of the execution permission condition for the LCA control is as described in the conditions (1) to (4). When the execution permission condition for the LCA control is not satisfied (No), the driving support ECU 10 advances the process to step S135, and determines whether the holding time Th counted from step S110 has reached the predetermined acceptance refusal time Tc. When the holding time Th reaches the acceptance refusal time Tc (Yes), the driving support ECU 10 advances the process to step S137 to cancel the execution of the LCA control, and proceeds to the process of step S160 described below. On the other hand, when the holding time Th has not reached the acceptance refusal time Tc (Yes), the driving support ECU 10 returns the process to step S110.

When the execution permission condition for the LCA control is satisfied in step S130 (Yes), the driving support ECU 10 advances the process to step S140 and starts driving the steering motor 52 under the LCA control. That is, the subject vehicle VS starts moving from the original lane toward the adjacent target lane.

In step S142, the driving support ECU 10 determines whether a first stop condition in which another vehicle is traveling in the target lane approaches the subject vehicle VS and the inter-vehicle distance cannot be sufficiently secured is satisfied. When the first stop condition is satisfied (Yes), the driving support ECU 10 proceeds to the process of step S149, stops the LCA control, and proceeds to the update process of step S160, which will be described below, while the subject vehicle VS is traveling in the original lane. On the other hand, when the first stop condition is not satisfied (No), the driving support ECU 10 advances the process to step S144 while continuing the LCA control.

In step S144, the driving support ECU 10 determines whether the subject vehicle VS has entered the target lane across the white line (boundary line) between the original lane and the target lane. When the subject vehicle VS has not entered the target lane (No), the driving support ECU 10 returns the process to step S142. On the other hand, when the vehicle enters the target lane (Yes), the driving support ECU 10 advances the process to step S146.

In step S146, the driving support ECU 10 determines whether a second stop condition in which the "rear approaching vehicle" that approaches the subject vehicle VS from the rear within the predetermined time exists is satisfied. When the second stop condition is satisfied (Yes), the driving support ECU 10 advances the process to step S147 to perform "vehicle approach warning", returns the subject vehicle VS to the original lane in step S148, and stops the LCA control in step S149. Then, the driving support ECU 10 advances the process to the update process of step S160 described below. On the other hand, when the second stop condition is not satisfied (No), the driving support ECU 10 advances the process to step S150 while continuing the LCA control.

In step S150, the driving support ECU 10 determines whether the predetermined LCA completion condition is satisfied. When the LCA completion condition is not satisfied (No), the driving support ECU 10 returns the process to step S146. On the other hand, when the LCA completion condition is satisfied (Yes), the driving support ECU 10 advances the process to step S160.

Here, when the threshold time $Tv_n$ used for the determination in step S120 is used as it is for the determination to start the next LCA control, various problems may occur when the next LCA control is executed.

Specifically, when the threshold time $Tv_n$ is set to a long time with respect to the driver's proficiency level in terms of the LCA system, there may be a difference between the time when the driver intends to start the lane change and the time when the LCA control is actually started, which may cause trouble for the driver. On the other hand, when the threshold time $Tv_n$ is set to a short time with respect to the driver's proficiency level, even in a situation where the driver's intention to change a lane is not clear, or in a situation where the driver fails to check the surrounding conditions, there is a possibility that LCA control will be started.

The driving support ECU 10 of the present implementation device has a function of appropriately extending or shortening the threshold time $Tv_n$ depending on the proficiency level of the driver in order to solve these problems. Specifically, in step S160, the driving support ECU 10 updates ($Tv_n \rightarrow TV_{n+1}$) the threshold time $Tv_n$ according to the driver's proficiency level calculated by the proficiency level calculation function described below, and then stores the updated new threshold time $Tv_{n+1}$ in the memory of the driving support ECU 10 as a threshold value used for the start determination of the next LCA control. When the threshold time $TV_{n+1}$ is stored, the driving support ECU 10 temporarily ends the LCA control routine. In the present embodiment, the LCA control is started when a determination of YES is made in step S120 of the flowchart of FIG. 6. Then, it ends when the LCA control routine illustrated in the flowchart of FIG. 6 is temporarily ended. Therefore, even during the LCA control, the steering motor 52 may not be driven (that is, the subject vehicle VS does not perform the operation related to the lane change).

Hereinafter, the details of the driver's proficiency level evaluation and the threshold time $Tv_n$ update process performed by the driving support ECU 10 will be described.

Proficiency Level Calculation and Threshold Time Update Process

Figure 7:
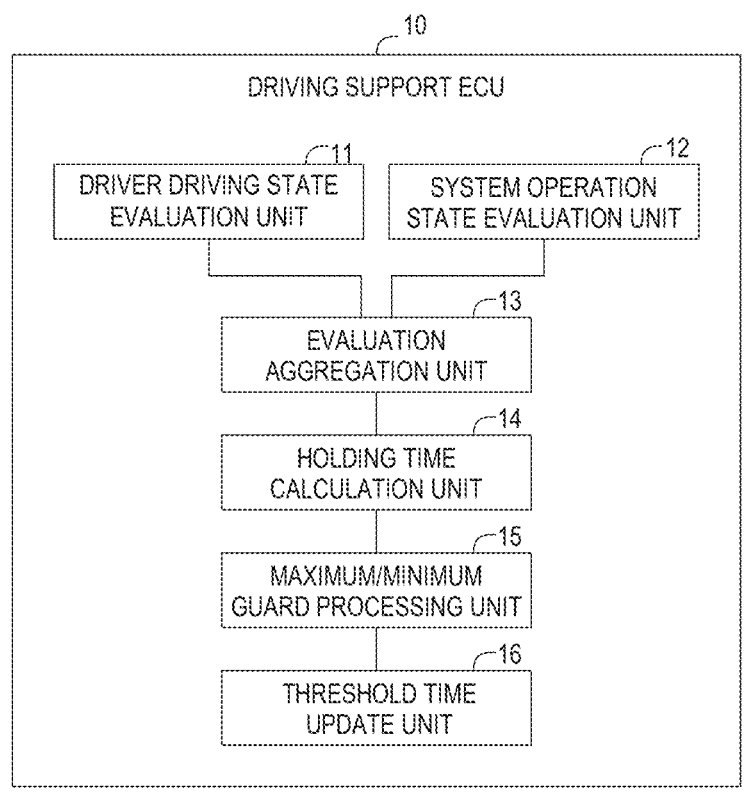
FIG. 7 is a block diagram schematically illustrating each functional element used for executing proficiency lever evaluation and a threshold time update process.

FIG. 7 is a block diagram schematically illustrating functional elements provided in the driving support ECU 10 that execute the proficiency level calculation process and the threshold time update process. The driving support ECU 10 includes a driver driving state evaluation unit 11, a system operation state evaluation unit 12, an evaluation aggregation unit 13, a holding time calculation unit 14, a maximum/minimum guard processing unit 15, and a threshold time update unit 16 as functional elements.

The driver driving state evaluation unit 11 evaluates the driver's proficiency level in operating the present implementation device from the viewpoint of the degree of the driver's overconfidence in the present implementation device (lane change support device) and the driver's driving situation during the execution of the LCA control. Specifically, the driver driving state evaluation unit 11 determines which of the following situations (A0), (A1), and (A2) the driver's steering holding state corresponds to in the current LCA control.

(A0) Normal state of steering holding. The normal state of the steering holding is a state in which the driver always holds the steering wheel while the LCA control is being executed. When the case corresponds to this situation, the driver driving state evaluation unit 11 determines that the driver is not overconfident in the present implementation device (lane change support device).

(A1) First abnormal state of steering holding. The first abnormal state of the steering holding is a situation (state in which the steering is not held) in which the driver releases his or her hand from the steering wheel while the LCA control is being executed. When the case corresponds to this situation, the driver driving state evaluation unit 11 determines that the driver may be overconfident in the present implementation device (lane change support device).

(A2) Second abnormal state of steering holding. The second abnormal state of the steering holding is a situation in which the driver releases his or her hand from the steering wheel while the LCA control is being executed, and even though a "steering holding request" is made, the steering wheel is not held. When the case corresponds to this situation, the driver driving state evaluation unit 11 determines that the driver is significantly overconfident in the present implementation device (lane change support device).

The situation from among the situations (A0), (A1), and (A2) that the state of the driver's steering holding corresponds to may be determined based on the detection signal from the hands free sensor 36 during the execution of the LCA control. The first abnormal state of the steering holding in the situation (A1) also includes a state in which the driver temporarily holds the steering wheel while the LCA control is being executed.

Further, the driver driving state evaluation unit 11 determines, during the execution of the LCA control, which of the following situations (A3), (A4), and (A5) corresponds to the situation of the nearby vehicle when the current LCA control is executed.

(A3) First situation of a nearby vehicle. The first situation of the nearby vehicle is a situation in which, in a state where another vehicle (that is, a nearby vehicle) is present in the target lane, the driver performs an activation operation (operation of the operating lever 80 to the first operation position PIL (PIR)), and then the driving support ECU 10 cannot execute the LCA control because another vehicle exists in the target lane until the holding time Th reaches the acceptance refusal time Tc. When the case corresponds to this situation, the driver driving state evaluation unit 11 determines that the driver does not understand the operating status of the present implementation device (lane change support device), that is, when the LCA control can be performed.

(A4) Second situation of a nearby vehicle. The second situation of the nearby vehicle is a situation in which, in a state where another vehicle is present in the target lane, the driver performs a start-up operation (operation of the operating lever 80 to the first operation position PIL (PIR)), and then the inter-vehicle distance between the subject vehicle VS and another vehicle traveling in the target lane cannot be sufficiently secured until the holding time Th reaches the threshold time Tv, and thus the driving support ECU 10 starts the LCA control later than usual. When the case corresponds to this situation, the driver driving state evaluation unit 11 determines that the driver has not been able to perform the start-up operation of the present implementation device (lane change support device) according to the situation of the nearby vehicle.

(A5) Third situation of a nearby vehicle. The third situation of the nearby vehicle is a situation in which, in a state where another vehicle is present in the target lane, the driver performs a start-up operation (operation of the operating lever 80 to the first operation position PIL (PIR)), and then the inter-vehicle distance between the subject vehicle VS and another vehicle traveling in the target lane is secured until the holding time Th reaches the threshold time Tv, and thus the driving support ECU 10 can execute the LCA control. When the case corresponds to this situation, the driver driving state evaluation unit 11 determines that the driver is able to perform the start-up operation of the present implementation device (lane change support device) according to the situation of the nearby vehicle and is familiar with the activation operation of the present implementation device.

The items determining the situation according to the driver driving state evaluation unit 11 are not limited to these situations (A1) to (A5), and can be set arbitrarily.

Figure 6:
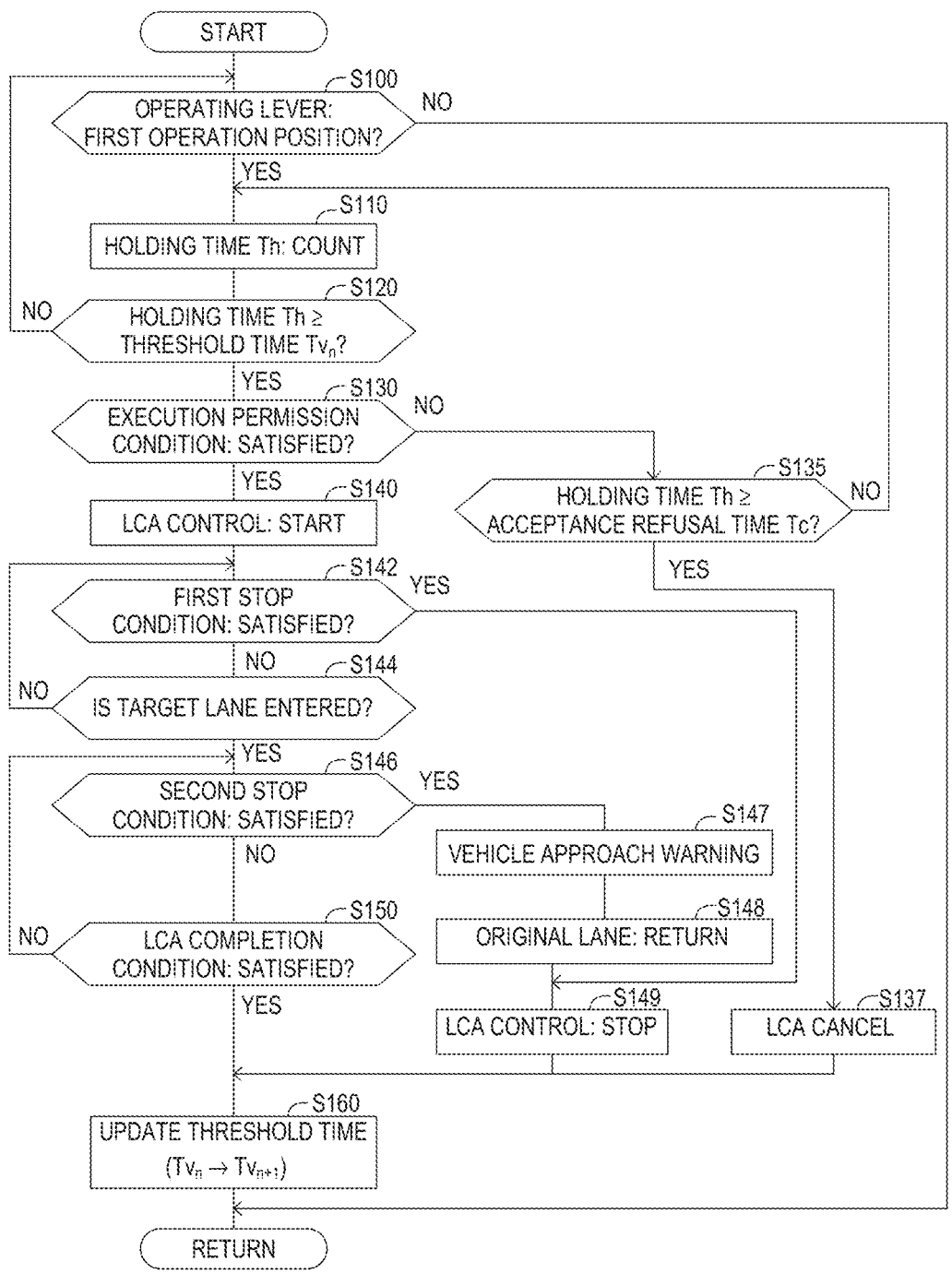
FIG. 6 is a flowchart illustrating a specific process of a lane change control routine.

When the case corresponds to the situation (A3), the determination in step S135 of the flowchart illustrated in FIG. 6 is affirmative (Yes). Also, when the situation (A4) is the case, the determination in step S135 of the flowchart illustrated in FIG. 6 is negative (No), and the process is returned to step S110 and then proceeds to step S140. When the situation (A5) is the case, in the flowchart illustrated in FIG. 6, the process proceeds to step S140 without going through step S135.

As described above, after determining the steering holding status and the status of the nearby vehicle in the current LCA control, the driver driving state evaluation unit 11 evaluates the proficiency level of the driver's operation with respect to the present implementation device, which is estimated from the driving state by the driver, according to the determined situation. Specifically, the driver driving state evaluation unit 11 calculates the evaluation score of the proficiency level based on the steering holding status, and also calculates the evaluation score of the proficiency level based on the status of the nearby vehicle.

The following points are taken into consideration when calculating the evaluation score of the proficiency level based on the state of the steering holding. That is, the second abnormal state of steering holding in the situation (A2) is a state in which the driver ignores the "steering holding request" and does not hold the steering wheel during the period from the start to the end of the LCA control. Such a situation is a situation in which the driver is overconfident in the present implementation device, and it is considered that the driver is not proficient in the operation of the present implementation device because the driver is overconfident in the present implementation device. Therefore, the evaluation score in the case corresponding to the situation (A2) is lower than the evaluation score in the case corresponding to the situation (A1). In addition, when the driver is not overconfident in the present implementation device, the driver tries to master the activation operation of the present implementation device by themselves so it can be said that the proficiency level of the operation for the present implementation device is high. Therefore, the evaluation score in the case corresponding to the situation (A0) is higher than the evaluation score in the case corresponding to the situation (A1). Therefore, when the evaluation score corresponding to the situation (A0) is S0, the evaluation score corresponding to the situation (A1) is S1, and the evaluation score corresponding to the situation (A2) is S2, these evaluation scores have a relationship of S0>S1>S2. The higher the evaluation score, the higher the evaluation of the proficiency level.

In addition, the following points will be taken into consideration when calculating the evaluation score of the proficiency level based on the status of the nearby vehicle. That is, when the case corresponds to the situation (A3) where the LCA control could not be executed, it can be said that the driver does not understand when the LCA control can be executed, and the proficiency level of the operation for the present implementation device is low. In addition, when the case corresponds to the situation (A4) in which the LCA control could be executed with a delay, it can be said that the driver understands when the LCA control can be executed, but the driver is not very proficient in the operation of the present implementation device. Further, when the case is the situation (A5) in which the LCA control could be executed without delay, it can be said that the driver understands when the LCA control can be executed and is highly proficient in the operation of the present implementation device. Therefore, when the evaluation score corresponding to the situation (A3) is S3, the evaluation score corresponding to the situation (A4) is S4, and the evaluation score corresponding to the situation (A5) is S5, the evaluation scores have a relationship of S5>S4>S3. The higher the evaluation score, the higher the evaluation of the proficiency level.

In the driver driving state evaluation unit 11, an evaluation score S in the view of the driving state of the driver in the current LCA control is calculated by adding the evaluation score calculated based on the state of the steering holding and the evaluation score calculated based on the situation of the nearby vehicle as in the above example. The evaluation score S in the view of the driving state by the driver may be calculated by adding a value obtained by multiplying the evaluation score calculated based on the state of the steering holding by a weighting coefficient and a value obtained by multiplying the evaluation score calculated based on the situation of the nearby vehicle by a weighting coefficient. The driver driving state evaluation unit 11 transmits the calculated evaluation score to the evaluation aggregation unit 13.

The system operation state evaluation unit 12 evaluates the proficiency level of the driver's operation with respect to the present implementation device from the viewpoint of whether the present implementation device operates normally and the LCA control can be completed. Specifically, the system operation state evaluation unit 12 determines which of the following states (B1), (B2), and (B3) corresponds to the end state of the current LCA control.

(B1) Normal end state. This state is a state where the driving support ECU 10 has started the LCA control and the LCA control can be completed without stopping the LCA control. When this state is the case, the system operation state evaluation unit 12 determines that the LCA control can be operated normally.

(B2) First abnormal end state. This state is a state where, after the driving support ECU 10 starts the LCA control, the LCA control is stopped because another vehicle approaches before the subject vehicle VS enters the target lane.

(B3) Second abnormal end state. This state is a state where, after the driving support ECU 10 starts the LCA control, the "vehicle approach warning" is issued due to the approach of another vehicle (rear approaching vehicle) after the subject vehicle VS has entered the target lane, and thus the driving support ECU 10 stops the LCA control.

The state determination items by the system operation state evaluation unit 12 are not limited to these states (B1) to (B3), and can be set arbitrarily.

The case corresponding to the state (B2) is the case where it is determined in step S142 of the flowchart illustrated in FIG. 6 that the first stop condition is satisfied (Yes). Further, the case corresponding to the state (B3) is the case where it is determined in step S146 of the flowchart illustrated in FIG. 6 that the second stop condition is satisfied (Yes). Also, the case corresponding to the state (B1) is the case where it is determined that the stop conditions of steps S142 and S146 in the flowchart illustrated in FIG. 6 are both unsatisfied (No).

After determining the end state of the current LCA control as described above, the system operation state evaluation unit 12 evaluates the proficiency level of the driver's operation with respect to the present implementation device, which is estimated from the operation state (end state) of the system in response to the determined state. Specifically, the system operation state evaluation unit 12 calculates the evaluation score of the proficiency level based on the system operation state (LCA control end state).

The following points are taken into consideration when calculating the evaluation score of the proficiency level based on the operation state (end state) of the system. That is, when it corresponds to the state (B3) in which the LCA control is stopped as a result of inviting a situation in which the possibility of collision with another vehicle increases as the subject vehicle VS enters the target lane, the driver has not acquired basic knowledge about the safety of the LCA control, and thus the evaluation score of the proficiency level is low. In addition, when it corresponds to the state (B2) in which the LCA control is stopped before entering the target lane, the driver has not fully acquired the basic knowledge about the safety of the LCA control, and thus the evaluation score of the proficiency level is not so high. When it corresponds to the state (B1) in which the LCA control can be normally ended, the driver is familiar with the safety of the LCA control, and thus the evaluation score of the proficiency level is the highest. Therefore, when the evaluation score corresponding to the state (B1) is R1, the evaluation score corresponding to the state (B2) is R2, and the evaluation score corresponding to the state (B3) is R3, the evaluation scores have a relationship of R1>R2>R3. The higher the evaluation score, the higher the evaluation of the proficiency level.

Then, as described above, the system operation state evaluation unit 12 calculates an evaluation score R in the view of the operation state (end state) of the system in the current LCA control, and transmits the calculated evaluation score to the evaluation aggregation unit 13.

The evaluation aggregation unit 13 calculates a proficiency level L of the driver based on the evaluation results (evaluation points S, R) transmitted from the driver driving state evaluation unit 11 and the system operation state evaluation unit 12. Specifically, in the present embodiment, the evaluation aggregation unit 13 calculates the driver's proficiency level L ($=S \cdot k_1 + R \cdot k_2$) by multiplying the evaluation score S transmitted from the driver driving state evaluation unit 11 and the evaluation score R transmitted from the system operation state evaluation unit 12 by preset weighting coefficients $k_1$ and $k_2$, respectively, and then adding them together. The weighting coefficient k may be set to a larger value as the evaluation item has a higher importance for each evaluation item, and can be set to an appropriate value depending on specific specifications such as vehicle performance. Then, the evaluation aggregation unit 13 transmits the calculated proficiency level L of the driver to the holding time calculation unit 14.

The proficiency level L obtained in this way reflects the driver's behavior (state of steering holding and status of nearby vehicle confirming situation) during execution of the lane change control. Further, the proficiency level L reflects the driver's perception of the safety in the LCA control. That is, according to the present embodiment, the proficiency level L can be appropriately calculated based on the driver's perception of the behavior and safety at the time of executing the LCA control.

The holding time calculation unit 14 calculates a holding time (hereafter, referred to as optimum holding time $Th_{n+1}$) by which the driver should hold the operating lever 80 at the successive start-up of the LCA control, based on the driver's proficiency level L transmitted from the evaluation aggregation unit 13. In particular, the holding time calculation unit 14 compares the proficiency level (hereinafter, previous proficiency level $L_{n-1}$) calculated at the time of executing the previous LCA control with the proficiency level (hereinafter, current proficiency level $L_n$) calculated at the time of executing the current LCA control.

When the current proficiency level $L_n$ is higher than the previous proficiency level $L_{n-1}$ ($L_n>L_{n-1}$), the holding time calculation unit 14 calculates a subtraction time $T_{sub}$ corresponding to a difference $\Delta L$ (=$L_n-L_{n-1}$) between the proficiency levels $L_n$ and $L_{n-1}$, and then the holding time calculation unit 14 calculates the optimum holding time $Th_{n+1}$ (=$TV_n-T_{Sub}$) by subtracting the subtraction time T sub from the current threshold time $Tv_n$ stored in the memory of the driving support ECU 10. Further, when the current proficiency level $L_n$ is lower than the previous proficiency level $L_{n-1}$ ($L_n<L_{n-1}$), the holding time calculation unit 14 calculates an addition time $T_{Add}$ corresponding to a difference $\Delta L$ (=$L_{n-1}-L_n$) between the proficiency levels $L_n$ and $L_{n-1}$, and then the holding time calculation unit 14 calculates the optimum holding time $Th_{n+1}$ (=$TV_n+T_{Add}$) by adding the addition time $T_{Add}$ to the current threshold time $Tv_n$. Also, when the current proficiency level $L_n$ is equal to the previous proficiency level $L_{n-1}$ ($L_n=L_{n-1}$), the holding time calculation unit 14 holds the current threshold time $Tv_n$ as the optimum holding time $Th_{n+1}$.

Here, the subtraction time $T_{sub}$ and the addition time $T_{Add}$ may be obtained by referring to a lookup table, based on the difference $\Delta L$, stored in advance in the memory of the driving support ECU 10. In the lookup table, the horizontal axis is the difference $\Delta L$, the vertical axis is the subtraction time $T_{sub}$ and the addition time $T_{Add}$, in some embodiments, the subtraction time $T_{sub}$ and the addition time $T_{Add}$ may be set to become larger as the difference $\Delta L$ increases. The calculation of the subtraction time $T_{sub}$ and the addition time $T_{Add}$ is not limited to the method using the lookup table, and may be calculated from a model formula or the like including the difference $\Delta L$ as the substitution value. In this way, the optimum holding time $Th_{n+1}$ calculated by the holding time calculation unit 14 is transmitted to the maximum/minimum guard processing unit 15.

The maximum/minimum guard processing unit 15 compares the optimum holding time $Th_{n+1}$ transmitted from the holding time calculation unit 14 with the predetermined minimum value $TV_{Min}$ and the maximum value $TV_{Max}$ and executes a guard process processing such that the update of the threshold time, which will be described below, falls within the range from the minimum value $TV_{Min}$ to the maximum value $TV_{Max}$.

For example, in the case of the optimum holding time $Th_{n+1}$ calculated by the holding time calculation unit 14 being shorter than the minimum value $Tv_{Min}$, if the optimum holding time $Th_{n+1}$ is updated in the same manner as the successive threshold time, it may be difficult to determine the driver's intention of using the present implementation device at the time of the successive LCA control. On the other hand, when the optimum holding time $Th_{n+1}$ calculated by the holding time calculation unit 14 is longer than the maximum value $TV_{Max}$, if the optimum holding time $Th_{n+1}$ is updated in the same manner as the successive threshold time, the blinking time of the turn signal indicator 61 becomes longer than the length of time it takes for the driver to actually perform the lane change at the time of the successive LCA control, which affects the nearby vehicles and there is a possibility that practicality will be impaired, such as in the form of the inability to properly execute the LCA control.

When the optimum holding time $Th_{n+1}$ transmitted from the holding time calculation unit 14 is shorter than the minimum value $TV_{Min}$ ($Th_{n+1}<TV_{Min}$), the maximum/minimum guard processing unit 15 determines the minimum value $TV_{Min}$ as the final threshold time $Tv_{n+1}$ suitable for the successive LCA control. Further, when the optimum holding time $Th_{n+1}$ transmitted from the holding time calculation unit 14 is longer than the maximum value $TV_{Max}$ ($Th_{n+1}>TV_{Max}$), the maximum/minimum guard processing unit 15 determines the maximum value $TV_{Max}$ as the final threshold time $Tv_{n+1}$ suitable for the successive LCA control. Further, when the optimum holding time $Th_{n+1}$ transmitted from the holding time calculation unit 14 is equal to or greater than the minimum value $Tv_{Min}$ and equal to or less than the maximum value $TV_{Max}$ ($TV_{Min} \leq Th_{n+1} \leq TV_{Max}$), the maximum/minimum guard processing unit 15 determines the optimum holding time $Th_{n+1}$ as the final threshold time $Tv_{n+1}$ suitable for the successive LCA control as it is without performing the guard processing. The minimum value $TV_{Min}$ and the maximum value $TV_{Max}$ may be set depending on specific specifications such as vehicle performance. The final threshold time $TV_{n+1}$ determined by the maximum/minimum guard processing unit 15 is transmitted to the threshold time update unit 16.

The threshold time update unit 16 executes an update process updating the current threshold time $Tv_n$ to the final threshold time $Tv_{n+1}$ determined by the maximum/minimum guard processing unit 15. In particular, in the process of step S160 of the flowchart illustrated in FIG. 6, the threshold time update unit 16 performs a process of updating the threshold time by rewriting the current threshold time $Tv_n$ stored in the memory of the driving support ECU 10 to the final threshold time $Tv_{n+1}$ transmitted from the maximum/minimum guard processing unit 15.

The new threshold time $TV_{n+1}$ updated in this way is used as a threshold time used for determining the start of the LCA control the next time the LCA system is started. That is, when the LCA system is started next time, the determination of the start of the LCA control is performed based on the new threshold time $Tv_{n+1}$ set according to the driver's proficiency level.

Therefore, with the present implementation device, if the driver's current proficiency level is higher than the previous proficiency level, the LCA control can be started at the time intended by the driver by shortening the threshold time used to determine the start of the successive LCA control. As a result, it becomes possible to improve the usability of the device. In addition, if the driver's proficiency level is lower than the previous proficiency level, by extending the threshold time used to determine the start of the successive LCA control, it becomes possible to prevent the device from starting the LCA control in a situation where the driver fails to check the surrounding conditions. As a result, it is also possible to improve the safety of the lane change.

Although the vehicle lane change support device according to the present embodiment is described above, the present disclosure is not limited to the embodiment described above, and various changes can be made as long as the object of the present disclosure is not deviated from.

For example, the present implementation device may have a function of correcting the threshold time Tv set in the above procedure according to the traveling vehicle speed of the subject vehicle VS when the successive LCA control is started. Further, the present implementation device may have a function of correcting the threshold time Tv set in the above procedure in relation to the degree of congestion in the vicinity of a position where the subject vehicle VS travels when the successive LCA control is started. Further, the threshold time Tv may be configured such that the setting can be changed depending on the driver's preference. Further, although the operating lever 80 of the turn signal indicator is described as an example of an operation part with which the driver requests the operation of the LCA control, an operating mechanism (for example, switches or the likes) other than the operating lever 80 may be used.

What is claimed is:

1. A lane change support device that includes a control unit configured to execute lane change control for enabling a vehicle to automatically change lanes from a lane in which the vehicle is traveling to an adjacent lane, wherein the control unit is configured to:
    count a holding time for which an operation part that is operated to a predetermined operation position to start the lane change control is continuously held at the operation position;
    start the lane change control when the counted holding time reaches a predetermined threshold time; and
    set the predetermined threshold time to be used for a successive lane change control based a state of steering holding of a driver, a situation of a nearby vehicle during execution of the lane change control, and an end state of the lane change control.

2. The lane change support device according to claim 1, wherein the control unit is configured to:
    calculate a proficiency level of the driver for an operation of the lane change support device during execution of the lane change control based on the state of steering holding of the driver, the situation of the nearby vehicle during execution of the lane change control, and the end state of the lane change control;
    set the predetermined threshold time to be used for a successive lane change control based on the proficiency level;
    compare a previous proficiency level calculated during previous execution of the lane change control with a current proficiency level calculated during current execution of the lane change control;
    shorten the predetermined threshold time to be used for a successive lane change control when the current proficiency level is higher than the previous proficiency level; and
    extend the predetermined threshold time to be used for the successive lane change control when the current proficiency level is lower than the previous proficiency level.

3. The lane change support device according to claim 2, wherein the proficiency level is calculated based on an evaluation score for the proficiency level obtained from the state of the steering holding of the driver, an evaluation score for the proficiency level obtained from the situation of the nearby vehicle, and an evaluation score for the proficiency level obtained from the end state of the lane change control.

4. The lane change support device according to claim 1, wherein the control unit is configured to:
    receive a release detection signal from a hands free sensor; and
    determine the state of steering holding of the driver based on the received release detection signal from the hands free sensor.

5. The lane change support device according to claim 4, wherein the hands free sensor detects whether the driver is holding a steering wheel of the vehicle.

6. The lane change support device according to claim 1, wherein the control unit is configured to:
    start the lane change control when the counted holding time reaches the predetermined threshold time and execution permission conditions are satisfied before a predetermined acceptance refusal time elapses; and
    prohibit the lane change control when the counted holding time reaches the predetermined threshold time and the execution permission conditions are not satisfied before the predetermined acceptance refusal time elapses.

7. The lane change support device according to claim 6, wherein the situation of the nearby vehicle during execution of the lane change control includes a first situation of the nearby vehicle, the first situation of the nearby vehicle is a situation in which, in a state where the nearby vehicle is present in the adjacent lane, when the counted holding time reaches the predetermined threshold time and the control unit cannot execute the lane change control until because the nearby vehicle exists in the adjacent lane before the holding time reaches the predetermined acceptance refusal time.

8. The lane change support device according to claim 7, wherein the situation of the nearby vehicle during execution of the lane change control includes a second situation of the nearby vehicle, the second situation of the nearby vehicle is a situation in which, in a state where the nearby vehicle is present in the adjacent lane, when the counted holding time reaches the predetermined threshold time and the control unit cannot execute the lane change control until because an inter-vehicle distance between the vehicle and the nearby vehicle cannot be secured before the holding time reaches the predetermined acceptance refusal time.

9. The lane change support device according to claim 8, wherein the situation of the nearby vehicle during execution of the lane change control includes a third situation of the nearby vehicle, the third situation of the nearby vehicle is a situation in which, in a state where the nearby vehicle is present in the adjacent lane, when the counted holding time reaches the predetermined threshold time and the control unit executes the lane change control until because the inter-vehicle distance between the vehicle and the nearby vehicle may be secured before the holding time reaches the predetermined acceptance refusal time.

10. The lane change support device according to claim 1, wherein the end state of the lane change control includes a normal end state, the normal end state is a state in which the control unit has started the lane change control and the lane change control can be completed without stopping the lane change control.

11. The lane change support device according to claim 10, wherein the end state of the lane change control includes a first abnormal end state, the first abnormal end state is a state in which, after the control unit has started the lane change control, the lane change control is stopped because the nearby vehicle approaches the vehicle before the vehicle enters the adjacent lane.

12. The lane change support device according to claim 11, wherein the end state of the lane change control includes a second abnormal end state, the second abnormal end state is a state in which, after the control unit has started the lane change control, the control unit issues a warning due to the nearby vehicle approaching the vehicle after the vehicle has entered the adjacent lane.

* * * * *